INVENTOR
WALTER GRADA
ATTORNEYS

Feb. 10, 1970  W. GRADA  3,495,208
METHOD OF AND APPARATUS FOR REGULATING AND MAINTAINING
CONSTANT THE SPEED OF DRIVING MOTORS
Filed April 4, 1966  2 Sheets-Sheet 2

INVENTOR
WALTER GRADA
BY
Wolf, Greenfield + Hieken
ATTORNEYS

United States Patent Office 3,495,208
Patented Feb. 10, 1970

1

3,495,208
METHOD OF AND APPARATUS FOR REGULATING AND MAINTAINING CONSTANT THE SPEED OF DRIVING MOTORS
Walter Grada, Bremen, Germany, assignor to Fried. Krupp Gesellschaft mit beschrankter Haftung, Essen, Germany
Filed Apr. 4, 1966, Ser. No. 540,044
Int. Cl. G01s 9/66; G05b 5/01
U.S. Cl. 340—3
4 Claims

ABSTRACT OF THE DISCLOSURE

Echo sounding apparatus of the type having a controllable speed motor driving a distance measuring or indicating element and connected to the output of a differencing circuit that provides a different signal representative of the difference between an actual analog voltage representative of the motor speed and a desired analog voltage representative of the desired speed of the motor. The rate of a multivibrator is converted into the desired analog voltage and controlled in accordance with the propagation characteristics of the medium in which the echo sounding apparatus is being used.

This invention relates to a method of an apparatus for regulating and maintaining constant the speed of driving motors for the distance measuring device in echo sounding equipment.

Known echo sounding equipments work with speed regulation by means of a centrifugal governor, which either serves as a brake or controls the regulation by interruptions of current. These known methods have the disadvantage that when the centrifugal governor is used as a brake undesirably high power is required, which must be removed as waste heat. Regulation by interruption of current has the disadvantage of sparking, with the consequent disturbances. Moreover, neither method provides the desired accuracy of constant speed adjustment.

It is an object of the present invention to provide a means of regulating and maintaining constant the speed of driving motors of echo sounding equipment, in which the abovementioned disadvantages are avoided.

To this end, the present invention consists in a method of regulating and maintaining constant the speed of driving motors for the distance measuring unit in echo sounding equipment, characterised in that a frequency proportional to speed is derived from the motor speed, converted by analog conversion into a direct current voltage proportional to frequency, and said direct current voltage to provide a differential voltage is compared by subtraction with a desired voltage, and that this differential voltage is used as a controlling value for application to a correcting unit controlling the motor speed. By virtue of the method of the invention, an accurate speed can be obtained and maintained constant without great power and without sparking.

The method of the invention also makes it possible in an advantageous manner to change the range of measurement by simple means. Whereas in the known method of maintaining constant speed with the aid of a centrifugal governor, a gear shift system was necessary for this purpose, in the method according to the invention the change of measurement range can be effected electrically. For this purpose the frequency proportional to speed is advantageously subjected to frequency division, in such manner that for example with a frequency division of 2:1 the speed rises to twice the value. For the puropse of changing the measurement range however the desired voltage may also be correspondingly changed.

In order to keep the speed constant, use may be made either of a stable source of direct current voltage or of a frequency oscillator with derivation of the desired voltage through an analog converter. In both cases substantially better constancy of speed can be achieved than is obtainable by previously known methods of speed regulation.

Particularly great accuracy in maintaining a constant speed can be achieved according to a feature of the invention, by comparing the phase positions of the frequencies used to derive these direct current voltages, additionally to the direct current voltage comparison between the actual voltage and the desired voltage, the measured phase difference value being used as correction value for the control voltage of the motor correcting unit.

The method of the invention also provides the advantageous possibility of effecting in a simple and reliable manner an automatic regulation of the speed in dependence on the speed of sound existing in each case in the transmission medium of the echo sounding. This can be achieved by deriving the desired voltage from the transit time of sound pulses through a measuring path containing the transmission medium of the echo sounding. This measurement may be made in a simple and effective manner by synchronising, by means of the sound pulses arriving at the end of the measurement path, a multivibrator from which the transmission pulses are derived, so that its working frequency from which the desired voltage is derived varies proportionally with the speed of sound on the measurement path.

In order that the invention may be more readily understood, reference is made to the accompanying drawings which illustrate diagrammatically and by way of example, several embodiments thereof, and in which.

Figures 1, 2, 3:
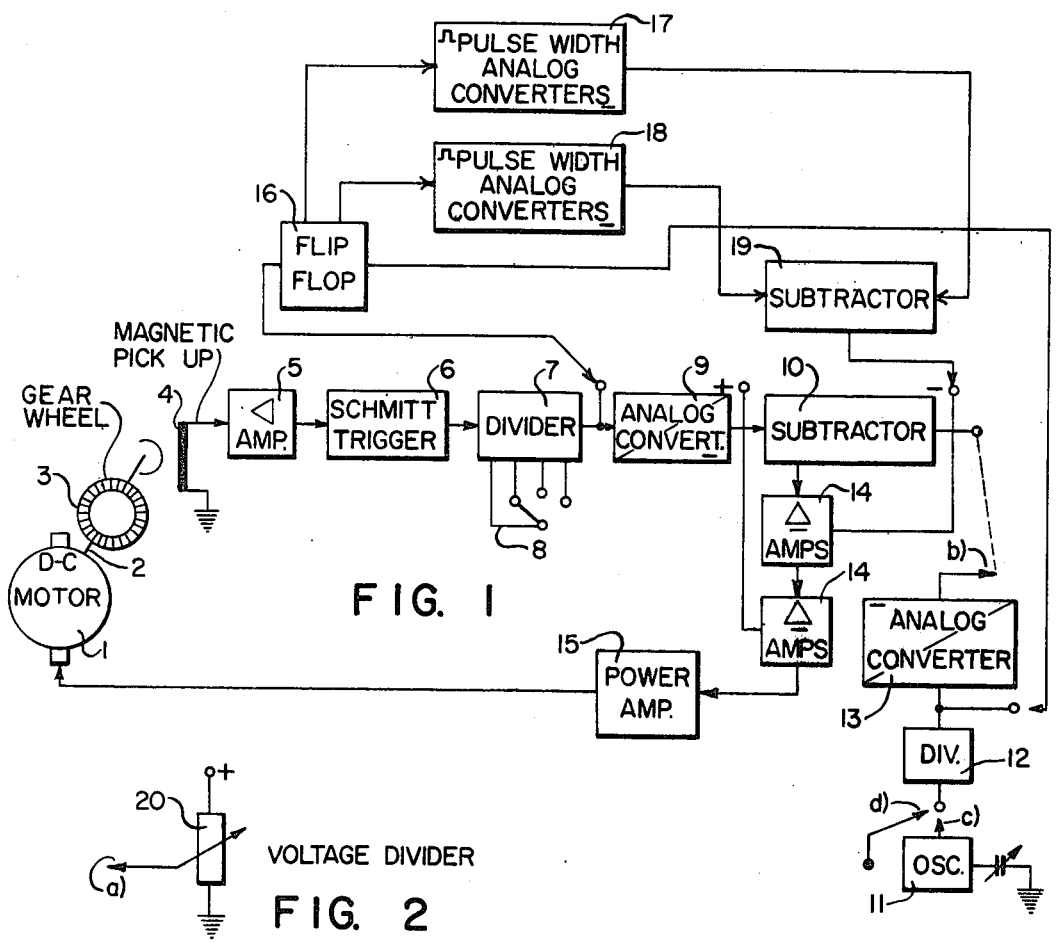
FIGURE 1 shows a block circuit diagram of one embodiment of a device according to the invention.
FIGURE 2 is a modification of the arrangement illustrated in FIGURE 1.
FIGURE 3 is a circuit diagram of the oscillator provided in FIGURE 1 for the purpose of automatically taking into account the speed of sound.

The devices illustrated in the drawing serve for regulating and maintaining constant the driving motors for the distance measuring unit in echo sounding equipment. The distance measuring unit used by be the rotating neon tube of a red light indicator or the writing member of an echograph. In the so-called ground map recorder, in which the distance is converted into different degrees of optical density, it is also important to keep as constant as possible the driving motor for time control in dependence on the impulse transmission.

A direct current motor 1, on the shaft 2 of which a gear wheel 3 is mounted, serves as driving motor for regulating the maintenance of speed constancy. By means of this gear wheel there is produced in a magnetic pick-up 4 a frequency which is proportional to speed and which after amplification in an amplifier 5 is converted in a Schmitt trigger circuit 6 into a rectangular voltage.

For the purpose of changing the range of measurement, this rectangular voltage is subjected to frequency division in a frequency divider 7 which can be changed over by a switch 8 for example to the frequency divisions 1:1, 2:1, and 4:1. In an adjoining analog converter 9 the output voltage of the frequency divider is converted into a direct current voltage proportional to frequency. This voltage, designated hereinbelow as "actual voltage," is compared in a subtractor 10 with a desired voltage which is derived from the frequency of an oscillator 11 through a fixed frequency divider 12 and an analog converter 13.

The differential voltage resulting from the actual voltage and the desired voltage, after amplification in a multi-stage direct current voltage amplifier 14 and a power stage 15, is fed to the direct current motor 1 as a speed correcting signal, typically controlling the motor field current to regulate speed.

For the purpose of fine correction, in addition to the comparison of the actual voltage and desired voltage from the two analog converters 9 and 13, a comparison is also made of the phase positions of the frequencies, used for the derivation of these direct current voltages, from the frequency divider 7 and the frequency divider 12. These two frequencies are fed to a flip-flop 16, the switching position of which is dependent on the mutual phase position of the two frequencies. In each of the two outputs of the flip-flop 16 there is a pulse width analog converter 17 and 18 respectively which produces a direct current voltage corresponding to the pulse width. The difference between the two direct current voltages is produced in a subtractor 19 and fed, additionally to the differential voltage from the subtractor 10, to the multi-stage direct current voltage amplifier 14.

Omitting the parts 11 to 13 and 16 to 19, a simplified circuit arrangement can be constructed by removing the desired voltage buffer and voltage divider 20, which is fed by a stabilised voltage source (FIGURE 2).

In conjunction with the circuit arrangement illustrated in FIGURE 1 an automatic variation of motor speed in dependence on the speed of sound existing in each individual case in the sound transmission medium of the echo sounding can be achieved, by making the frequency of oscillator 11 dependent on the speed of sound in accordance with FIGURE 3.

For this purpose a measuring path L is provided which consists of a path transmitting sound and containing the transmission medium used in the echo sounding, particularly water. At one end of the measuring path there is situated a sound generator 21, and at the other end a sound receiver 22. The sound generator 21 is connected through a pulse stage 23 to a multivibrator 24, which is triggered by the pulses received by the receiver 22. The receiver 22 is for this purpose connected through an amplifier 25 and a Schmitt trigger circuit 26 to the multivibrator 24. The multivibrator frequency is received through a separating stage 27 and fed to the analog converter 13 and optionally at the desired voltage to the frequency divider. Thus, the propagation time over the path L is representative of the sound transmission characteristics of the medium; the longer this time, the lower the multivibrator frequency.

Within the scope of the invention various modifications and other embodiments are also possible. Thus for example the frequency of the oscillator 11 may also be adjustable by hand to the respective speed of sound in the medium used for echo sounding. In addition, it is possible to effect the comparison of the actual frequency with a desired frequency directly without analog conversion. For example by causing the actual frequency and the desired frequency to act on a common forward-reverse counter, the counter reading is utilised as control value for maintaining a constant speed.

Figure 4:
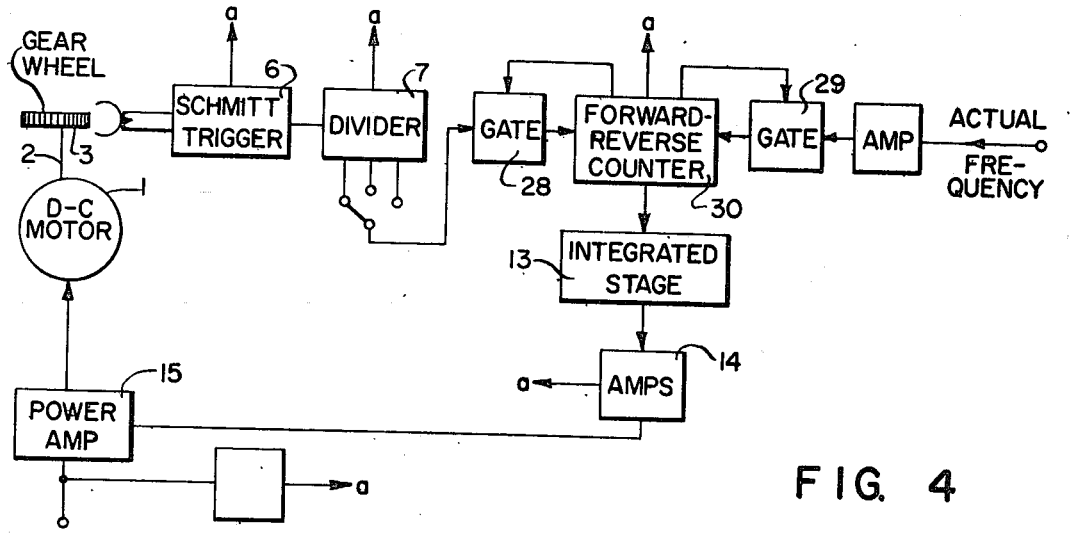
FIGURE 4 is a block circuit diagram of another embodiment.

An example of an arrangement of this type is illustrated in FIGURE 4, where the actual frequency and the desired frequency are fed through respective gate circuits 28 and 29 to a device for phase comparison, for example a forward-reverse counter 30 the output of which is connected through an integrated stage 31 to the amplifier 14.

Figure 5:
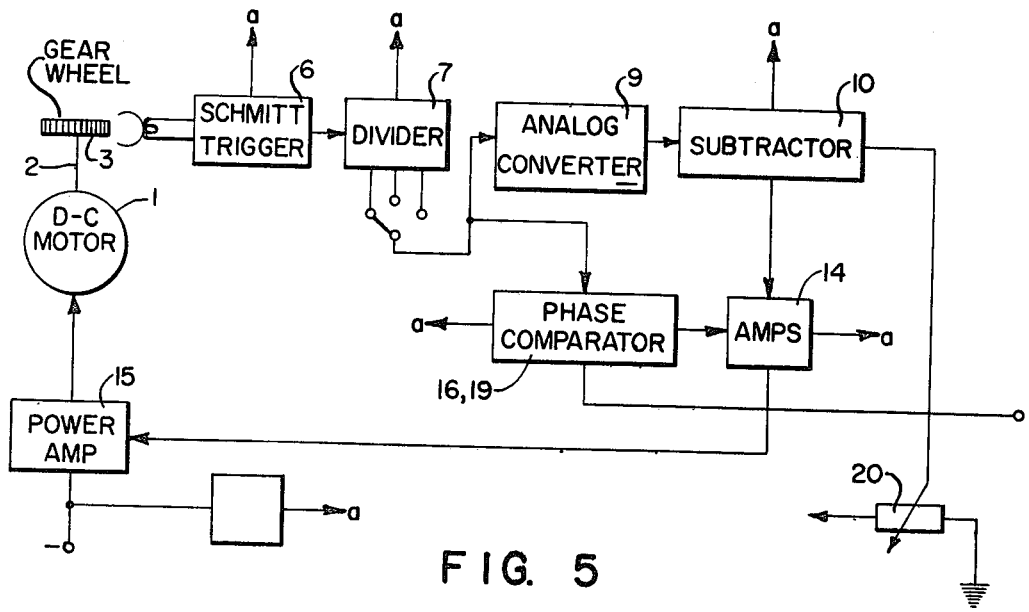
FIGURE 5 is a block circuit diagram of a still further embodiment.

In the arrangement illustrated in FIGURE 5 the actual frequency and the desired frequency are passed to a phase comparison circuit corresponding to the circuit 16—19 illustrated in FIGURE 1 with the difference that the desired direct current voltage is taken from a voltage divider 20, as in the case of FIGURE 2.

The motor speed may also be controlled in dependence on the speed of sound in other ways than that described; in particular it is possible to utilise known methods of echo sounding for measuring the speed of sound in which the sounding sequence frequency is used as a measure of the distance measured, the following sounding pulse in each case being triggered by the returning echo, or when a transmitter-receiver station is provided at both ends of the distance measuring path, by alternately triggering the transmission of a sound pulse by the sound pulses arriving respectively from the other side. Since the length of the measuring path in the present case is constant or known, variations in transit time occur only in dependence on the speed of sound, which is dependent on the medium, and the sounding sequence frequency is thus an exact measure of the speed of sound in the transmission medium in each case.

As is already known in the measurement of the speed of sound by this or a similar method, the measuring path may lie directly in the transmission medium for the echo sounding, and may for example be disposed in a fixed position outboard of the ship. In addition, one end point or both end points of the measuring path may be situated in an apparatus towed by the ship.

I claim:
1. In echo sounding apparatus of the type having a controllable speed motor driving a distance indicating element and connected to the output of a circuit for forming a difference signal representative of the difference between an actual analog signal representative of said controllable speed and a desired analog signal representative of the desired speed of said motor,
the improvement comprising a reference oscillator,
means for controlling the frequency of said reference ocsillator in accordance with the speed of propagation of echo sounding pulses in the echo sounding apparatus sounding pulse transmission medium along a predetermined measuring path,
a source of a rate signal of frequency integrally related to the reference oscillator frequency,
and means for converting said rate signal into an analog signal as said desired analog signal.
2. The improvement in accordance with claim 1 and further comprising,
switchable frequency dividing means coupled to said reference oscillator for providing said rate signal.
3. The improvement in accordance with claim 1 and further comprising,
phase subtracting circuit means energized by said actual analog signal and said desired analog signal for providing a phase difference signal representative of the difference in phase between the motor speed and said rate signal,
and means for coupling said phase difference signal to said controllable speed motor to reduce said difference in phase.
4. The improvement in accordance with claim 1 wherein said means for controlling comprises echo sounding pulse transmitting means and echo sounding pulse receiving means embracing said predetermined measuring path, multivibrator means comprising said reference oscillator, means for coupling said transmitting means to said multivibrator means, and means for coupling said receiving means to said multivibrator means to trigger the latter in response to said receiving means receiving a pulse transmitted over said path from said transmitting means after a time interval related to the echo sounding pulse propagation speed in said medium whereby the reference oscillator frequency corresponds to that of said multivibrator and is related to said propagation speed.

References Cited

UNITED STATES PATENTS

| | | | |
|---|---|---|---|
| 2,841,775 | 7/1958 | Saunders | 340—3 |
| 3,110,853 | 11/1963 | Jones | 318—318 X |
| 3,207,970 | 9/1965 | Branco | 318—318 X |
| 3,215,918 | 11/1965 | Lichowsky | 318—314 X |
| 3,356,921 | 12/1967 | Bradford et al. | 318—318 |

RICHARD A. FARLEY, Primary Examiner

U.S. Cl. X.R.

318—314